US009952431B2

United States Patent
Chen

(10) Patent No.: US 9,952,431 B2
(45) Date of Patent: Apr. 24, 2018

(54) HEAD-UP DISPLAY DEVICE WITH DRIVING VIDEO RECORDER

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 267 days.

(21) Appl. No.: 15/052,869

(22) Filed: Feb. 24, 2016

(65) Prior Publication Data

US 2017/0240112 A1 Aug. 24, 2017

(51) Int. Cl.
*B60R 1/00* (2006.01)
*G02B 27/01* (2006.01)
*H04N 5/225* (2006.01)

(52) U.S. Cl.
CPC ....... *G02B 27/0149* (2013.01); *H04N 5/2257* (2013.01)

(58) Field of Classification Search
USPC ........................................ 348/115
See application file for complete search history.

(56) References Cited

U.S. PATENT DOCUMENTS

2015/0232030 A1\* 8/2015 Bongwald ................ B60R 1/00
348/115

\* cited by examiner

*Primary Examiner* — Anand S Rao
*Assistant Examiner* — Tyler B Edwards
(74) *Attorney, Agent, or Firm* — Guice Patents PLLC

(57) ABSTRACT

The present invention relates to a head-up display device with driving video recorder, which includes a device body, a camera lens, an adjustment module, a display module and a reflective sheet, a virtual image reflected and enlarged by the reflective sheet is overlapped with images of the road ahead, such an integrated device combined with a head-up display device and a driving video recorder is provided for a to driver to see driving information and images of the road at the same time, and an angle of a front side camera lens is provided to be adjusted according to demands, to thereby improve driving safety.

16 Claims, 5 Drawing Sheets

HEAD-UP DISPLAY DEVICE WITH DRIVING VIDEO RECORDER

BACKGROUND OF THE INVENTION a) Field of the Invention

The present invention relates to a head-up display device with driving video recorder and, more particularly, to an integrated device combined with a head-up display device and a driving video recorder, a virtual image reflected and enlarged by its reflective sheet is overlapped with images of the road ahead, so that a driver may see driving information and images of the road at to the same time, and an angle of a camera lens is provided to be adjusted according to demands, to thereby improve driving safety.

b) Description of Prior Art

There are more and more information in vehicles, accidents may happen if drivers moves line of sight from the road during driving. A head-up display is device is provided for drivers to see the road ahead simultaneously during reading information, especially a head-up display device using a concave mirror to form a virtual image, which may be provided to enlarge the displayed area and the distance of the displayed image is enough, usually larger than 2 meters, so that drivers' focal length of reading displayed information is similar to focal length of watching road condition ahead, therefore drivers may take care the road condition during reading information, dangerous of driving may be greatly reduced.

Besides, traffic accidents may be happened sometimes. Thus, it is important that how to proof traffic violation of others for reducing self-responsibility when a traffic accident happens, so the sales of driving records get better and better. Driving recorders have been invented in 1925 in Germany, and the name of driving recorders is evolved from tachometer and graphic in Germany. A traditional driving recorder is mechanical type with a paper tray, which is provided to record working time and work content of two drivers respectively, information may be recorded, such as running time, working time, rest time, instantaneous speed. In 70s, an electronic-type driving recorder with a paper tray equipped electronic devices, such as a display screen, a printer, a magnetic card, a card reader, has been invented. However, with the development of science and technology, this kind of driving recorder has already been replaced by a driving recording device similar to black box on the airplane.

The driving recorders selling in the market currently could not be called driving recorders, they could only be called driving video recording devices. According to industry estimates, 100000 units have been sold last year. However, according to the related units, driving video recording devices installed by drivers could only used to provide evidences for accidents, may not have absolute legal force, attribution of responsibility may still be determined by police. From related official units, in the regulations, the "driving recorder" is a device forced to set on a bus or a tourist bus for recording information, such as is its driving and stopping time, variation in speed, and it may be provided to determine the safety of a bus driver. In a common traffic accident, a driving recorder may be used as an evidence for description, it has no absolute legal force, its effect is actually similar to accessing to surveillance cameras.

In recent years, the use of technology of driving recorders has been very common, and head-up display devices on aircraft have been used in vehicles. The related technology may be referred to cited references TW patent number M425068, CN104554003, TW publication number 585162, TW patent number 200624994, TW patent number 1398372, TW patent number M482516, TW patent number M455654, TW patent number M502853.

In these cited references, some cited references have already disclosed the feature of combining the driving recorder and the head-up device together, and some cited references have disclosed the feature of connecting the head-up display device with the video device, but there are the following drawbacks exist in use:

1. In the cited reference TW patent number M425068, although the technique of combining the driving video device and the head-up display device together, it is installed on the dashboard, there is a visual gap between images reflected by the reflective sheet and images of the road ahead. Thus, drivers may move line of sight when reading information during driving, there is still risk.

2. In the cited reference CN104554003, although the technique of a head-up display device connected to a video device has been disclosed, the head-up display device and the video device are two separate devices. The two devices may only occupy limited space in the vehicle, inconvenience of the to cable connected between two devices exists, and the cost for buying equipment may also be increased.

SUMMARY OF THE INVENTION

In view of the drawbacks of the conventional ones, the inventor finally completed the head-up display device with driving video recorder of the present is invention after numerous improvements, namely, the object of the present invention is to provide an integrated device combined with a head-up display device and a driving video recorder, a virtual image reflected and enlarged by its reflective sheet is overlapped with images of the road ahead, so that a driver may see driving information and images of the road at the same time, and an angle of a camera lens is provided to be adjusted according to demands, to thereby improve driving safety.

To achieve the object, the head-up display device with driving video recorder of the present invention, which includes:

a device body, a containing space is set inside, and a circuit board is set inside, a first display opening and a second display opening are set in front of the device body;

a front side camera lens, which is electrically connected to the circuit board and placed in the containing space, the front side camera lens is provided to capture images in front of a vehicle through the second display opening and output the images to the circuit board;

an adjustment module, including a first joint unit and a second joint unit, the second joint unit is set above the front side camera lens, the first joint unit is set on a top side inside the containing space, a steerable structure is consisted of the first joint unit and the second joint unit;

a display module, which is electrically connected to the circuit board and placed inside the containing space, is provided to receive the images output from the circuit board to project the images from the first display opening;

a reflective sheet, which is a concave mirror with translucent and semi-reflective effect, is set under a windshield, the reflective sheet is provided to enlarge a virtual image by using features of a concave mirror and reflect the images projected from the display module.

The first joint unit and the second joint unit, a shaft is set on to consist a shaft structure.

The first joint unit and the second joint unit are respectively a ball head is and a ball groove to consist a steerable structure.

The head-up display device with driving video recorder of the present invention further includes a holder, the holder is set above the device body and fixed on the windshield by a double-sided adhesive tape.

The head-up display device with driving video recorder of the present invention further includes an optical sensing module, the optical sensing module electrically connected to the circuit board is provided to adjust a brightness of the display module.

The head-up display device with driving video recorder of the present invention further includes a speaker module, the speaker module electrically connected to the circuit board is provided to inform the driver by voice information.

The head-up display device with driving video recorder of the present invention further includes a keypad, the keypad electrically connected to the circuit board is provided to operate the functions of the head-up display device with driving video recorder.

The head-up display device with driving video recorder of the present invention further includes a cable, the cable electrically connect to the circuit board is provided to receive signals from an electronic device by wire transmission. The reflective sheet is fixed on a dashboard of a vehicle or embedded into the dashboard.

The circuit board, further includes at least a lens input port, the lens input port is provided to connect to at least a surrounding camera lens set on a vehicle to capture images around the vehicle.

The circuit board, further includes a memory card slot, the memory card to slot is provided for a memory card to externally insert into, to thereby store captured images recorded by a record module.

The circuit board, further includes a G sensor, the G sensor is provided to detect a gravity value G.

The circuit board, further includes a GPS module, the GPS module is is provided to detect location of vehicles.

The circuit board, further includes a record module, the record module is provided to record images captured by the front side camera lens.

The circuit board, further includes a USB slot, the USB slot is provided for an USB interface of an electronic device to externally insert into.

The circuit board, further includes a wireless module, the wireless module is provided to receive signal data from an electronic device by wireless transmission.

DETAILED DESCRIPTION OF THE INVENTION

Figure 1:
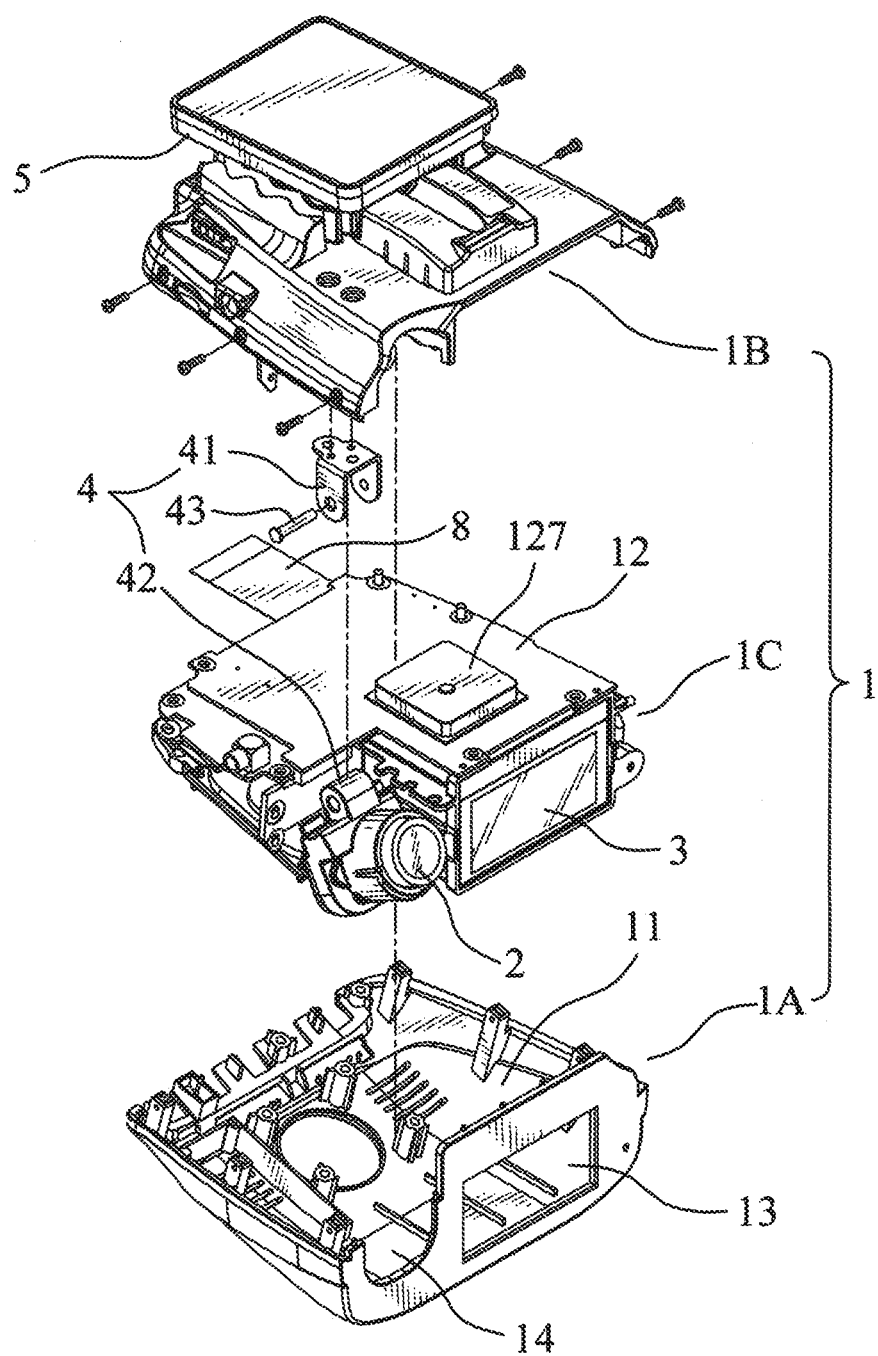
FIG. 1 is a three-dimensional exploded diagram of the present invention.
Figure 2:
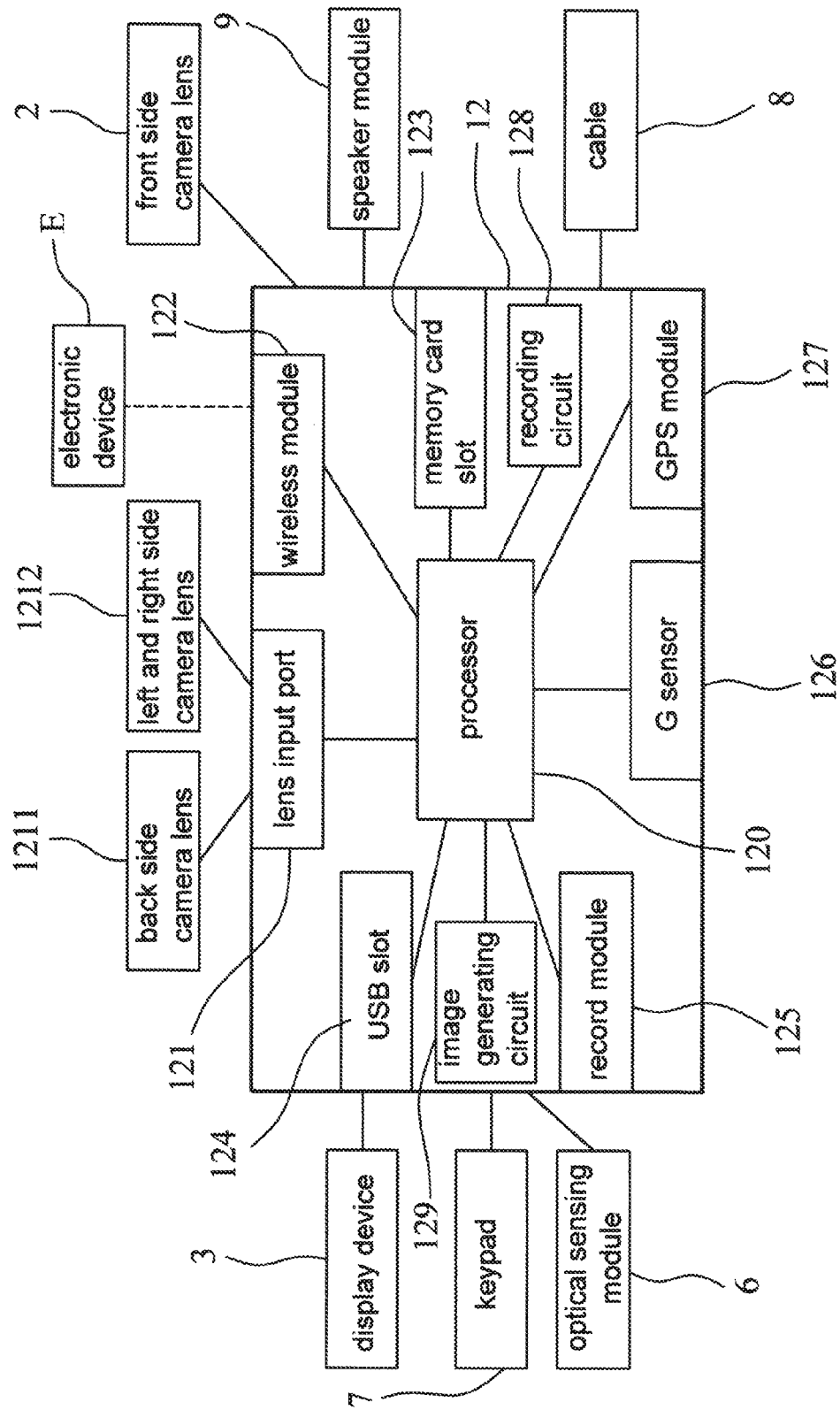
FIG. 2 is a block diagram of the present invention.
Figure 4:
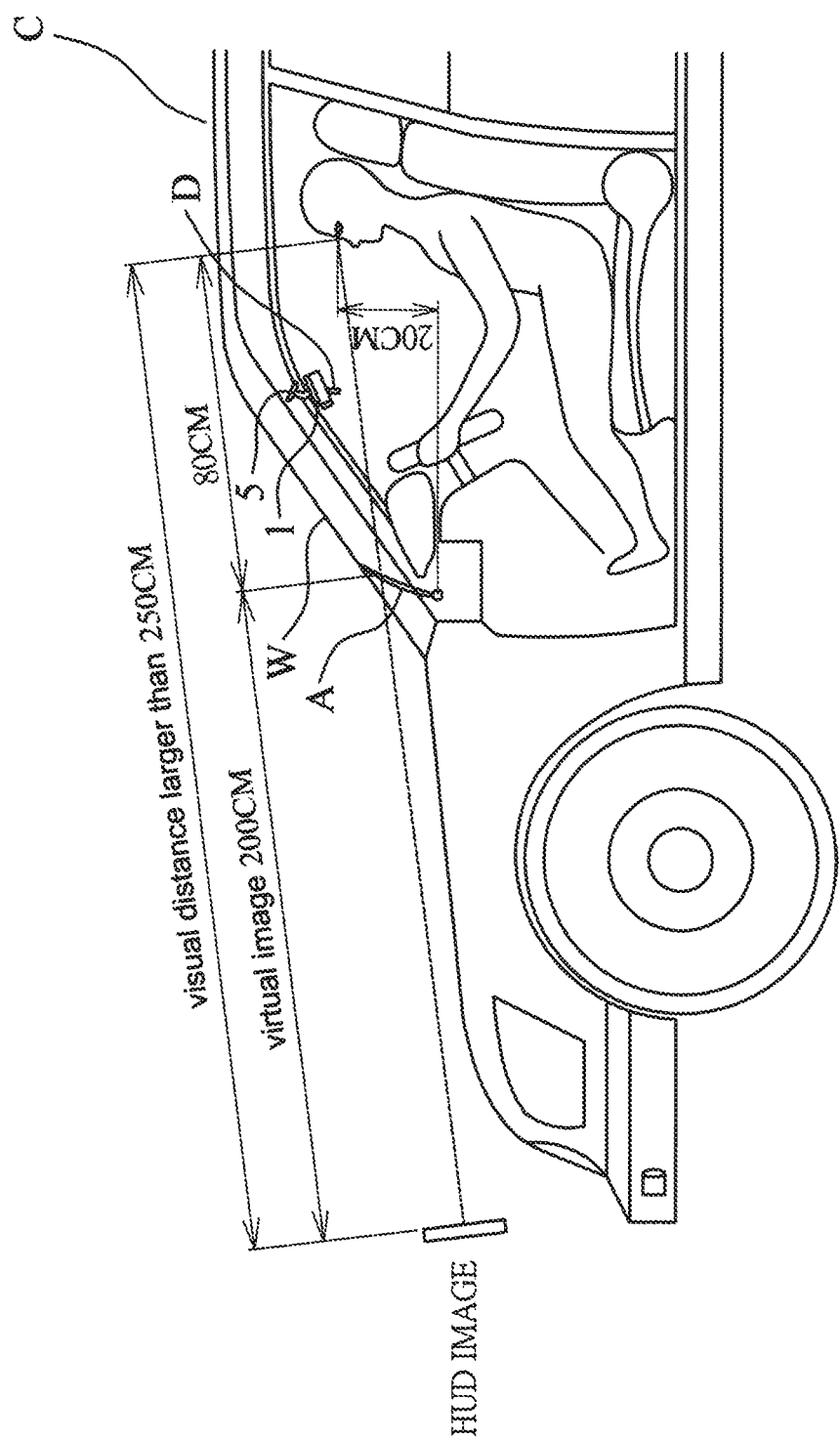
FIG. 4 is an analytical schematic diagram of the driver's line of sight of the present invention.

Please refer to FIG. 1, FIG. 2 and FIG. 4, which is an embodiment of the head-up display device with driving video recorder of the present invention, which includes:

a device body 1, which is consisted of a base 1A, a cover 1B and an internal component 10, a containing space 11 is set inside the device body 1, and a circuit board 12 is set inside, the circuit board 12 includes a processor 120, the processor 120 is provided to perform data processing and related information and output image information, a first display opening 13 and a to second display opening 14 are set in front of the device body 1;

a front side camera lens 2, which is electrically connected to the circuit board 12, the front side camera lens 2 is placed in the containing space 11, the front side camera lens 2 is provided to capture images in front of a vehicle C through the second display opening 14 and output the images to the circuit is board 12;

an adjustment module 4, including a first joint unit 41 and a second joint unit 42, the second joint unit 42 is set above the front side camera lens 2, the first joint unit 41 is set on a top side inside the containing space 11, a steerable structure is consisted of the first joint unit 41 and the second joint unit 42, a shaft is set on the first joint unit 41 and the second joint unit 42 to consist a shaft structure, the shaft 43 is a hinge;

a display module 3, which is electrically connected to the circuit board 12 the display module 3 is placed inside the containing space 11, is provided to receive the images output from the circuit board 12 and project the images from the first display opening 14, and the image information is about the image in front of the vehicle C;

a reflective sheet A, which is a concave mirror with translucent and semi-reflective effect, the reflective sheet A is set under a windshield W and may also be fixed on the dashboard, the reflective sheet A is provided to enlarge a virtual image by using features of a concave mirror, let the distance of the virtual image become far at the same ratio and reflect the images projected from the display module, so as to overlap the projected image and image of the road ahead.

Figure 3:
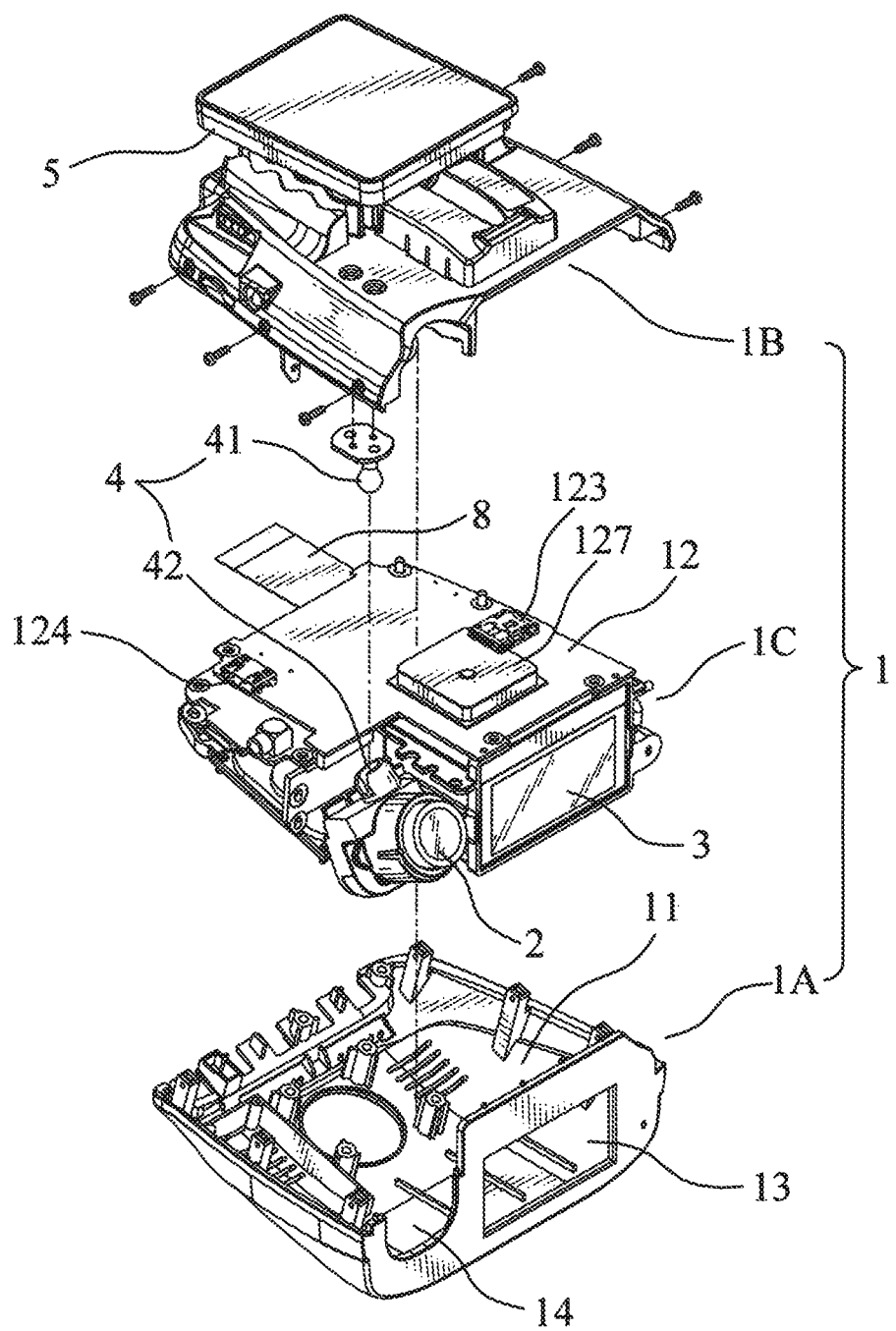
FIG. 3 is a three-dimensional exploded diagram of another embodiment of the present invention.

As shown in FIG. 3, which is another embodiment of the first joint unit 41 and the second joint unit 42, wherein the first joint unit 41 and the second joint unit 42 are respectively a ball head and a ball groove to consist a steerable structure similar to a common universal mechanism with steerable function.

The circuit board 12, further includes at least a lens input port 121, the lens input port 121 is provided to connect to at least a surrounding camera lens to set on the vehicle C to capture images around the vehicle C and a wild angle panoramic image is stitched by image processing, the surrounding camera lens are at least a back side camera lens 1211 and multiple left and right side camera lens 1212.

The circuit board further includes a wireless module 122, the wireless is module 122 is provided to receive signal data from an electronic device E by wireless transmission, the wireless module 122 is Bluetooth or Wi-Fi. The electronic device E is a vehicle device, a vehicle host, a vehicle audio device, a ceiling multimedia player, a headrest multimedia player, a hands-free device, a navigation device, a tire pressure detector, a smart phone or a tablet. Vehicle speed may be displayed if the electronic device E is connected to the present invention by wireless transmission. Signals, such as vehicle battery power, vehicle doors closed or not, a trunk lid closed or not, road speed limit, navigation instructions, may be shown as displayed image information. Tire pressure may be shown if it is a tire pressure detector. Various information sent by phone apps, except vehicle speed, could also be displayed if a smart phone is connected, such as wireless transmission from a mobile phone music player to the wireless module 122.

The circuit board 12, further includes a record module 125, the record module 125 is provided to record images captured by the front side camera lens 2 or images captured around the vehicle C from the lens input port 121 and record actual conditions out of the vehicle C during driving, so as to provide evidences for responsibility determination if an accident happens.

The circuit board 12, further includes a memory card slot 123, the memory card slot 123 is provided for a memory card to externally insert into, to thereby store captured images recorded by the record module 125 and captured images around the vehicle C from the lens input port 121; besides, music or video information could be read.

The circuit 12, further includes a USB slot 124, the USB slot 124 is provided to externally connect to an USB interface of the electronic device E for to reading music or video information in an USB flash drive.

The circuit board 12, further includes a G sensor 126, the G sensor 126 is provided to detect a gravity value G, the record module 125 is provided to record images and the gravity value G so as to provide evidences for responsibility determination if an accident happens, to thereby provide driver's is brake reaction or evidence of being hit.

The circuit board 12, further includes a GPS module 127, the GPS module 127 is provided to detect location of the vehicle C, the record module 125 is provided to record images and locations of the vehicle C so as to provide evidences for responsibility determination if an accident happens, to thereby provide accident location as evidence.

Please refer to FIG. 4, wherein the reflective sheet A is fixed on the dashboard of the vehicle C or embedded below the windshield in front of the dashboard.

The head-up display device with driving video recorder of the present invention further includes a holder 5. The holder 5 is set above the device body 1 and fixed on the windshield W by a double-sided adhesive tape.

The head-up display device with driving video recorder of the present invention further includes an optical sensing module 6, the optical sensing module 6 electrically connected to the circuit board 12 is provided to adjust a brightness of the display module 3 according to a detected sunlight intensity, so that the driver could see the information of displayed image clearly.

Figure 5:
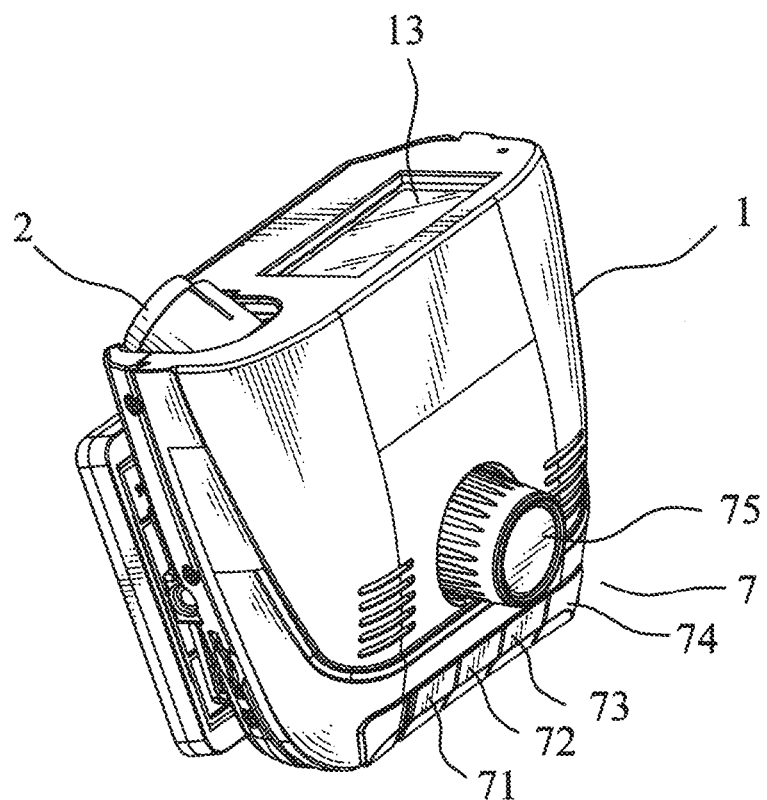
FIG. 5 is a three-dimensional schematic diagram of the present invention.

As shown in FIG. 5, the head-up display device with driving video recorder further includes a keypad 7, the keypad 7 set on the device body 1, which is electrically connected to the circuit board 12, is provided to operate the functions of the head-up display device with driving video recorder; the keypad 7 includes a power key 71, which is provided to start the head-up display device with driving video recorder; a record key 72, which is provided to start the record module 125 to record the images captured by the front side camera lens 2 or the images around the vehicle C sent from multiple lens input port 121; an image switching key 73, which is provided to switch for the displayed image of the display module 3 to the image captured by the front side camera lens 2, external images from the lens input port 121, or other images, such as navigation image; a press key 74, which is a functional operation key corresponding to various functions for the electronic device E, could be a play is key or a speaking key; a knob 75, which is an adjustment knob for controlling volume, for example, volume could be increased by rotating right to let the sound louder, volume could be decreased by rotating left to let the sound smaller.

The head-up display device with driving video recorder of the present invention further includes a cable 8, the cable 8 electrically connect to the circuit board 12 is provided to receive signals from an electronic device E by wire transmission. The electronic device E is a vehicle device, a vehicle host, a vehicle audio device, a ceiling multimedia player, a headrest multimedia player, a hands-free device, a navigation device, a smart phone or a tablet.

The head-up display device with driving video recorder of the present invention further includes a speaker module 9, the speaker module 9 electrically connected to the circuit 12 is provided to inform the driver by voice information and play voice files sent from the electronic device E or warning sounds.

The above device body 1, a screen D is set on its lower side, the front side camera lens 2 is set on another side, the shaft structure of the first joint unit 41 and the second joint unit 42 is provided to adjust the viewing angle of the front side camera lens 2, and the device body 1 further includes a recording circuit 128 and an image generating circuit 129.

As shown in FIG. 4, which is an analytical schematic diagram of the driver's line of sight, wherein the range of the driver's line of sight to the reflective sheet A is about 20 cm, and the distance between eyes and the reflective sheet A is about 80 cm. The reflective sheet A is provided to enlarge virtual images due to the concave mirror effect, the principle of virtual imaging is to that a concave mirror is used to image. Concave mirror imaging equation is: $1/p+1/q=1/f$; wherein f: focal length, q: object distance, p: image distance. Virtual images may be enlarged at a general magnification, and the distance of the virtual image may become far at the same ratio, about 4 to 6 times, so that readers may easily read it. If magnification is too large, readers may easily feel is dizzy. If we want the distance between the virtual image and driver's eyes larger than 2 meters, image may be formed in rear of the reflective sheet about 1.2 meters, and the HUD image projected by the display module 3 may be reflected and enlarged, so as to let its visual distance larger than 250 cm. The distance is a necessary visual distance for the image to overlap with the picture of the road ahead, focal length of driver's line of sight to the display module is similar to focal length of watching the road ahead. Thus, drivers may watch road condition while reading information, so the risk of driving may be reduced significantly, therefore the problem that there is a visual gap between displayed images of a conventional head-up display device and scene of the road could be solved.

What is claimed is:

1. A head-up display device with driving video recorder, which includes:
    a device body, a containing space is set inside, and a circuit board is set inside, a first display opening and a second display opening are set in front of the device body;
    a front side camera lens, which is electrically connected to the circuit board and placed in the containing space, the front side camera lens is provided to capture images in front of a vehicle through the second display opening and output the images to the circuit board;
    to an adjustment module, including a first joint unit and a second joint unit, the second joint unit is set above the front side camera lens, the first joint unit is set on a top side inside the containing space, a steerable structure is consisted of the first joint unit and the second joint unit;
    a display module, which is electrically connected to the circuit board and is placed inside the containing space, is provided to receive the images output from the circuit board to project the images from the first display opening;

a reflective sheet, which is a concave mirror with translucent and semi-reflective effect, is set under a windshield, the reflective sheet is provided to enlarge a virtual image by using features of a concave mirror and reflect the images projected from the display module.

2. The head-up display device with driving video recorder as claimed in claim 1, wherein a shaft is set on the first joint unit and the second joint unit to consist a shaft structure.

3. The head-up display device with driving video recorder as claimed in claim 1, wherein the first joint unit and the second joint unit are respectively a ball head and a ball groove to consist a steerable structure.

4. The head-up display device with driving video recorder as claimed in claim 1, further includes a holder, the holder is set above the device body and fixed on the windshield by a double-sided adhesive tape.

5. The head-up display device with driving video recorder as claimed in claim 1, further includes an optical sensing module, the optical sensing module electrically connected to the circuit board is provided to adjust a brightness of the display module.

6. The head-up display device with driving video recorder as claimed in claim 1, further includes a speaker module, the speaker module electrically connected to the circuit is provided to inform the driver by voice information.

7. The head-up display device with driving video recorder as claimed in claim 1, further includes a keypad, the keypad electrically connected to the circuit board is provided to operate the functions of the head-up display device to with driving video recorder.

8. The head-up display device with driving video recorder as claimed in claim 1, further includes a cable, the cable electrically connect to the circuit board is provided to receive signals from an electronic device by wire transmission.

9. The head-up display device with driving video recorder as claimed in claim 1, wherein the reflective sheet is fixed on a dashboard of a vehicle or embedded into the dashboard.

10. The head-up display device with driving video recorder as claimed in claim 1, wherein the circuit board further includes at least a lens input port, the lens input port is provided to connect to at least a surrounding camera lens set on a vehicle to capture images around the vehicle.

11. The head-up display device with driving video recorder as claimed in claim 1, wherein the circuit board further includes a memory card slot, the memory card slot is provided for a memory card to externally insert into, to thereby store captured images recorded by a record module.

12. The head-up display device with driving video recorder as claimed in claim 1, wherein the circuit board further includes a G sensor, the G sensor is provided to detect a gravity value G.

13. The head-up display device with driving video recorder as claimed in claim 1, wherein the circuit board further includes a GPS module, the GPS module is provided to detect location of vehicles.

14. The head-up display device with driving video recorder as claimed in claim 1, wherein the circuit board further includes a record module, the record module is provided to record images captured by the front side camera lens.

15. The head-up display device with driving video recorder as claimed in claim 1, wherein the circuit board further includes a USB slot, the USB slot is provided for an USB interface of an electronic device to externally insert into.

16. The head-up display device with driving video recorder as claimed in claim 1, wherein the circuit board further includes a wireless module, the to wireless module is provided to receive signal data from an electronic device by wireless transmission.

* * * * *